Feb. 3, 1953  M. H. TONCRAY ET AL  2,627,437
MOTOR VEHICLE BODY FRAME
Filed July 22, 1948  3 Sheets-Sheet 3
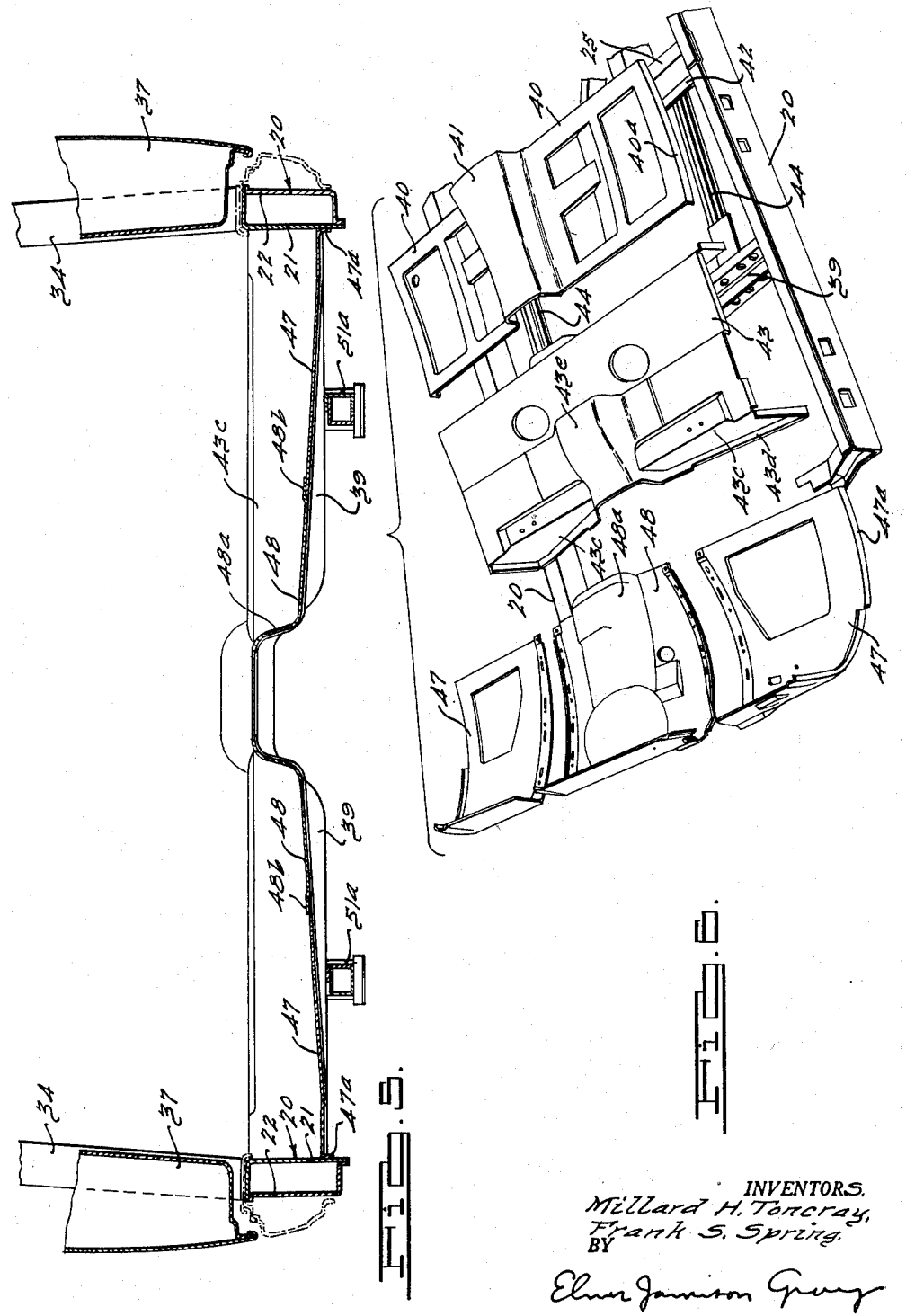
INVENTORS.
Millard H. Toncray,
Frank S. Spring.
BY
Elmer Jamison Gray
ATTORNEY.

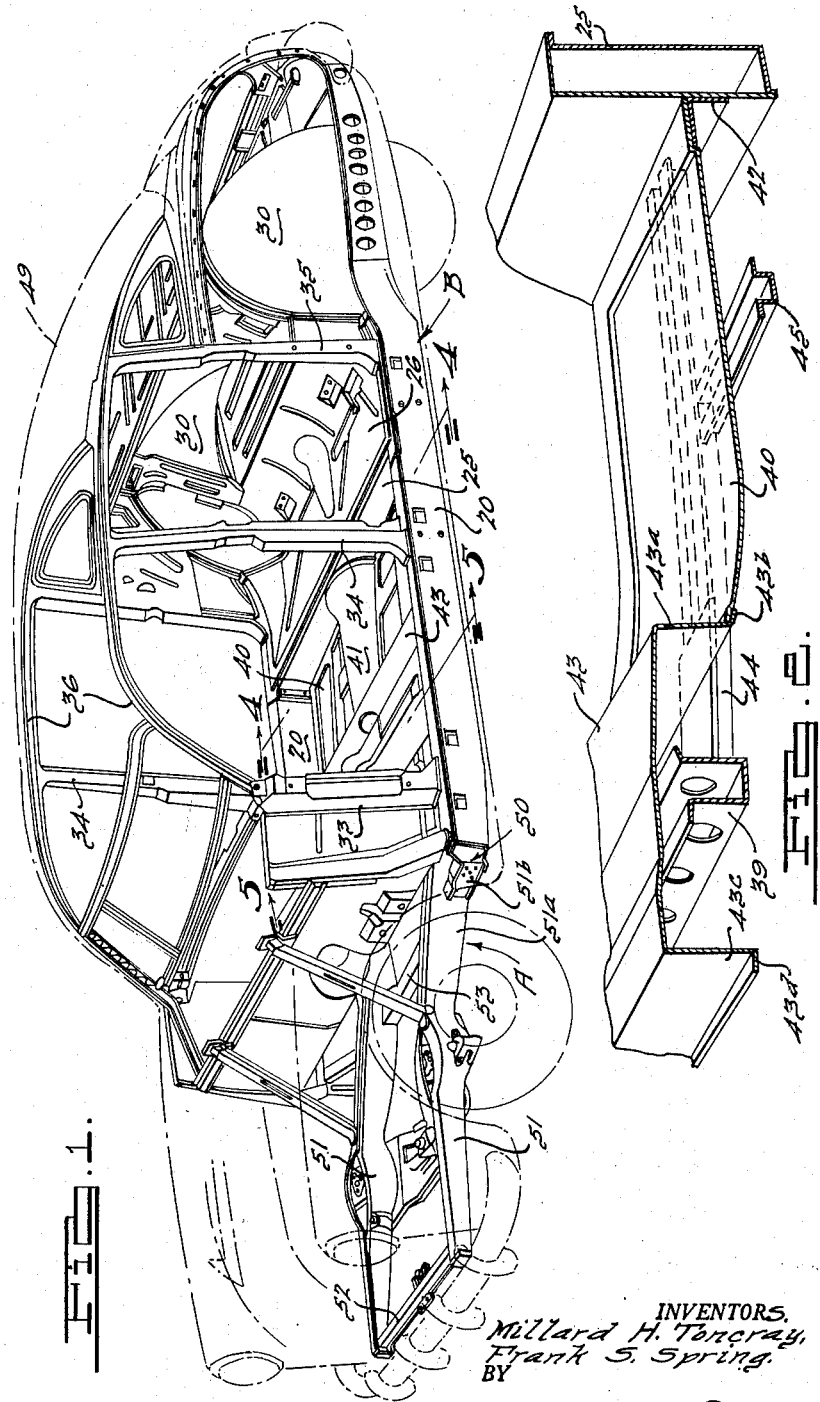

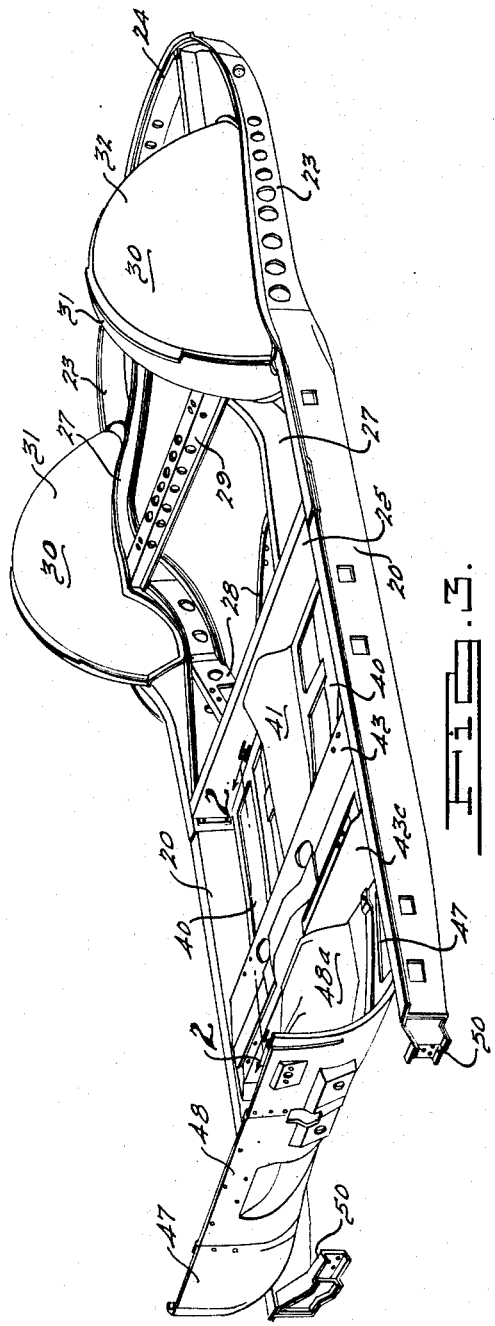

Patented Feb. 3, 1953

2,627,437

UNITED STATES PATENT OFFICE 2,627,437

MOTOR VEHICLE BODY FRAME

Millard H. Toncray and Frank S. Spring, Grosse Pointe, Mich., assignors to Hudson Motor Car Company, Detroit, Mich., a corporation of Michigan Application July 22, 1948, Serial No. 40,147

8 Claims. (Cl. 296—28)

This invention relates to motor vehicles and more particularly to improvements in the construction of the body and frame of automobiles, the present application being related to application Serial No. 19,616, filed April 7, 1948.

In the foregoing application there is shown and described an improved body and frame structure for an automobile wherein the frame is divided into two front and rear sections with the rear section forming a unitary part of the body, these two frame sections being telescoped and attached together or otherwise united at final assembly in such manner as to produce a composite full length frame possessing all of the requisites of strength and rigidity.

An object of the present invention is to provide an improved body and frame structure wherein the outer main side frame members, which extend longitudinally of the body, are spaced substantially the full width of the body, and wherein portions of the floor or floor pan members immediately in advance of the front seat or rear seat or both extend inwardly from the side frame members and are depressed a distance equal to the major depth of the side frame members, this lowering of portions of the floor at localities where the feet of the passengers rest enabling the seats as well as the entire body to be lowered.

A further object of the invention is to arrange the outer main side frame members substantially along the outer margins of the doors and immediately beneath the lower edges thereof and to depress or lower the portions of the floor or floor pan lying adjacent and inwardly of these frame members a distance at least equal to the major depth of these frame members. As a result of this improved construction the passenger may enter the car with less effort since he steps down into the passenger compartment instead of stepping up onto a floor, as heretofore, which extends above the longitudinal side frame members. This improved construction further has the advantage of lowering the body and the center of gravity thereof without sacrificing the desired head room for the passengers.

Another object of the invention is to provide in an automobile or vehicle body an improved frame and floor structure which permits the lowering of the body without sacrificing headroom within the body and which also permits entering through the doorway into the body with greater ease.

Other objects of this invention will appear in the following description and appended claims, reference being had to the accompanying drawings forming a part of this specification wherein like reference characters designate corresponding parts in the several views.

Fig. 1 is a perspective view illustrating the component assembled frame members of an automobile constructed in accordance with one embodiment of the present invention.

Fig. 2 is an enlarged section taken substantially through lines 2—2 of Fig. 3 looking in the direction of the arrows.

Fig. 3 is a perspective view of that portion of the main frame which supports the body, the latter being removed in this view.

Fig. 4 is an enlarged section taken substantially through lines 4—4 of Fig. 1 looking the direction of the arrows.

Fig. 5 is an enlarged section taken substantially through lines 5—5 of Fig. 1 looking in the direction of the arrows.

Fig. 6 is an exploded perspective view illustrating particularly the component floor members of the vehicle body.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

In the drawings there is illustrated, by way of example, one embodiment of the present invention in which the frame structure of the automotive vehicle is divided into two front and rear sections which, as parts of two sub-assemblies, are joined together during the final assembly of the vehicle. The front frame section forming part of the power plant sub-assembly is indicated generally at A, and the rear frame section forming part of the body sub-assembly is indicated generally at B.

The frame section B includes two main longitudinally extending and laterally spaced generally parallel side frame members 20, each being fabricated from a number of parts which are welded together to form unitary structural members which are connected together around the rear of the body to produce a unitary outer frame structure. As illustrated in Figs. 4 and 5, each side frame member 20 comprises inner and outer angle members 21 and 22 which extend to the locality of the wheel housing, these angle members being assembled and welded together to provide a closed box section. The side frame members 20 are rigidly secured at their rear ends by welding to a pair of laterally spaced rear side frame members 23 which are also preferably in the form of box-like sections. The rear side frame members 23 which form extensions of the members 20 are rigidly attached at their rear ends by welding to a rear transversely extending frame member 24 which is also preferably in the form of a box section. From the foregoing it will be seen that the main frame members 20, 23 and 24 produce a generally U-shaped unitary main frame extending continuously around the body along the sides and around the rear end thereof.

The side frame members 20 are connected together by a cross frame member 25 which is box-like in cross section, as shown in Fig. 2, and is secured at its ends by riveting or welding or both to the members 20. This cross frame member 25 extends substantially along and beneath the front edge of the rear seat which is mounted upon a rear seat tray 26, see Fig. 1, rigidly secured along its front edge to the top of the frame member 25, as by welding. Mounted inside the main outer side frame members and spaced inwardly thereof are a pair of supplemental longitudinal frame members 27 which extend from the cross frame member 25 to the rear cross frame member 24 and are rigidly secured at their ends to these cross frame members, as by welding. The inner longitudinal frame members 27 are preferably box-like in construction and the front ends thereof are braced to the cross member 25 by means of angularly extending channel shaped braces 28, these braces being rigidly secured to the frame members 27 and the cross member 25 by welding. Rearwardly of the cross member 25 and in the region of the wheel housings the inner longitudinal frame members 27 are rigidly connected together by means of an inverted channel shaped cross frame member 29 which is secured in position by welding.

Since each inner longitudinal frame member 27 lies inwardly of the adjacent outer side frame members 20, 23, there is provided therebetween a space through which one of the rear wheels extends. These spaces, occupied by the rear wheels, are closed by means of wheel housing units 30 which form complete enclosures for the upper parts of the wheels. As illustrated in Fig. 3, each wheel housing unit 30 comprises a pair of dished pressed metal sections 31 and 32, each section being substantially arcuate in shape so as to extend completely around the upper part of the wheel. The inner section 31 has a depending side wall which extends down to the frame member 27 and terminates in a marginal flange which engages the top of the frame member 27 and is welded thereto. The outer section 32 of the wheel housing unit also has an outer wall extending down to the frame 20, 23 and is formed with an edge flange engaging the top of the frame and welded thereto. The meeting edges of the wheel housing sections 31, 32 have abutting flanges which are welded together.

As illustrated in Fig. 1, the super-structure of the body, which is constructed by way of example to provide a four door sedan, comprises front pillars 33, center pillars 34 and rear pillars 35. The side frame members 20 are spaced apart substantially the full width of the body so that the lower ends of the pillars 33, 34 and 35 bear directly upon the frame members 20 and are rigidly secured thereto as by welding. The upper ends of these pillars are joined together by means of longitudinally extending header members 36. Where the body is designed, as in the present instance, for the purpose of a four door sedan, each front door 37 is installed between the pillars 33 and 34, and each rear door 38 is installed between the pillars 34 and 35, the doors being hinged to certain of these pillars in the usual manner. Thus, it will be seen that by spacing the side frame members 20 substantially the full width of the body so as to directly underlie the lower ends of the pillars 33—35 these frame members also will lie directly beneath the lower edges of the doors, as shown in Figs. 4 and 5. As a consequence of this construction which gains considerable strength due to the pillars rising directly from the side frame members 20, it will be apparent that the floor pan or floor pan members lying between the side frame members 20 are not governed as to height by the height of the side frame members.

The main side frame members 20 are joined in advance of the cross frame member 25, see Figs. 2 and 6, by an upwardly opening channel shaped cross member 39. Extending transversely between the side frame members 20, see Fig. 4, and forwardly of the cross frame member 25, see Fig. 2, is a rear seat floor pan 40 formed centrally thereof with an upwardly offset portion 41 forming a part of the propeller shaft tunnel. As illustrated in Fig. 4, the portions of the floor pan 40 at opposite sides of the tunnel portion 41 slope outwardly and downwardly and the outer edges of these floor pan portions have depending flanges 40a which abut against the inner members 21 of the side frames 20 near the lower edges thereof, the flanges 40a being welded to these side frame members. The rear edge of the floor pan 40 overlies and is welded to transverse angle members 42, see Fig. 2, which in turn are welded to the cross frame member 25 near the bottom thereof.

Mounted upon the transverse frame member 39 is a front seat tray 43 which is provided at its rear with a downwardly extending generally vertical flange 43a terminating at its lower edge in a rearwardly extending flange 43b overlapped by the front edge of the rear seat floor pan 40, these overlapping portions being welded together. The front seat tray 43 has a central upwardly offset tunnel portion 43e and at opposite sides thereof the front of this seat tray is formed with depending generally vertical flanges 43c which terminate at their lower edges in forwardly extending flanges 43d. From the foregoing it will be seen that the portions of the rear floor pan 40 at opposite sides of the tunnel portion 41 are depressed well below the upper edges of the side frame members 20 and the cross frame member 25, the average amount which these portions of the rear floor pan 40 are depressed or lowered being at least equal to the major depth of these frame members. The rear floor pan 40 at opposite sides of the tunnel portion 41 is additionally supported by means of a pair of longitudinal channel shaped frame members 44 which, as shown in Figs. 2 and 6, extend from the cross frame member 39 to the cross frame member 25 and are welded thereto, the upper edges of these frame members 44 being outwardly flanged and welded to the floor pan 40. Extending inwardly from the frame members 44, see Fig. 4, in supporting relation to the floor pan 40 are a pair of cross frame members 45 which terminate short of the tunnel portion 41 and are tied together by means of an underlying member 46 welded thereto.

From the foregoing construction it will be seen that the body frame structure not only includes a double longitudinal frame at each side extending from the cross frame member 25 to the rear frame member 24, but also includes a double longitudinal frame at each side extending between the cross frame members 39 and 25. This latter double frame construction at each side of the vehicle comprises the outer main frame members 20 and the inner longitudinal supplementary frame members 44, the latter being joined by the cross tie members 45 and 46. The front seat tray is not only supported by the cross frame member 39 but also by the inner longitudinal frame members 44.

The front seat floor pan mounted in advance of the front seat tray 43 comprises in the present instance two side floor pan members 47 and a central floor pan member 48, the latter being offset upwardly at 48a to provide a tunnel portion. The central floor pan member 48 at opposite sides of the tunnel portion 48a slopes outwardly and downwardly and has its outer side edges arranged in overlapping relation to the inner side edges of the floor pan members 47 and welded thereto at 48b. As shown in Fig. 5, the floor pan members 47 form in effect continuations of the central floor pan member 48 and correspondingly slope outwardly and downwardly and terminate in depending flanges 47a welded to the inner members 21 of the main frame members 20 near the lower edges thereof. When assembled together the abutting edges of the tunnel portions 48a and 43e are welded together and the rear sloping edges of the front floor pan members 47 and 48 overlap the correspondingly sloped flanges 43d of the front seat tray 43 and are welded thereto. The front edges of the floor pan members 47 and 48 terminate in upwardly extending flanges which are welded to the dash. From the foregoing it will be seen that the portions of the front seat floor pan members 47, 48, see Fig. 5, at opposite sides of the central tunnel portion 48a are depressed well below the main side frame members 20 as well as the cross frame member 39, the amount in which these portions of the front seat floor pan are depressed or lowered being at least equal to the major depth of the side frame members 20.

The lowering of the floor pans 40 and 47, 48 a distance equal to at least the major depth of the main side frame members 20 as well as the main cross frame members 25 and 39 is rendered possible by spacing the side frame members substantially the full width of the body so that the floor of the body will lie entirely between these side frame members. This permits advantage to be taken of the depth or height of the side frame members in lowering the floor and, as a consequence, lowering the roof panel 49 an equivalent amount and thereby lowering materially the center of gravity of the vehicle.

It will be noted from Fig. 1 that the side frame members 20 terminate a short distance in advance of the front pillars 33. Attached to the front ends of the side frame members 20 are stub frame extensions 50 which extend inwardly preferably at right angles to the frame members 20 and form not only abutments for locating the front frame unit A when assembled with the frame unit B but also connectors therefor. As shown and described more fully in the above mentioned application Serial No. 19,616, the stub frame extensions 50 are in the form of channels opening forwardly and are rigidly attached by welding to the forward terminal ends of the frame members 20.

The front sub-assembly unit A comprises spaced longitudinally extending side frame members 51 which may be box-like in construction generally similar to the side frame members 20. These members 51 are joined at their front ends by a front cross member 52 which is preferably box-like in cross section. The frame members 51 of the front sub-assembly unit A provide mountings for the power plant, front wheels, shock absorbers, springs, steering mechanism and associated parts. These members have extensions 51a which extend rearwardly between and spaced inwardly of the frame members 20, and as disclosed in the above mentioned application the rear ends of these frame extensions 51a are rigidly attached to the bottom of the cross member 39 when the sub-assemblies A and B are assembled together. The frame extensions 51a are rigidly connected together in line with the stub extensions 50 by means of a cross frame member 53 which is in the form of an inverted U-shaped channel. This channel extends through slots in the frame extensions 51a and is rigidly secured thereto by welding. The cross frame member 53 extends laterally beyond the outer sides of the front extensions 51a to provide connector extensions 51b.

During the final assembly operation when the frame extensions A and B of the front and rear sub-assembly are assembled together, the front section A is telescoped with the rear section by shifting the frame extensions 51a into position between the side frame members 20 so as to couple the extensions 51b with the connector members 50. When this is accomplished these coupled portions are rigidly welded together. At the same time the rear terminal ends of the frame extensions 51a are positioned beneath the cross frame member 39 and rigidly secured thereto by bolts and welding in the manner more fully shown and described in the above mentioned application. Thus, it will be seen that the cross frame member 53 rigidly connects together the front ends of the main outer side frame members 20 and the extensions 51a of the front frame section A form with the outer side frame members 20 at each side of the vehicle a double frame structure between the cross frame members 53 and 39.

We claim:

1. In a motor vehicle body, paired inner and outer longitudinal side frame members at each side, transversely spaced upright body pillars having the lower ends thereof attached to the outer side frame members, a forward cross frame member connecting said longitudinal side frame members at the region underlying the vehicle front seat, a second cross frame member spaced rearward of the front seat and connecting said outer longitudinal side frame members, the inner longitudinal frame members being secured to the lower portions of the forward cross frame member, the upper edges of the inner longitudinal frame members intermediate said cross frame members being at the level of the lower portions of the outer longitudinal frame members, and a floor member overlying said inner longitudinal frame members in supported relation and secured to said outer side frame members substantially below the upper edges thereof.

2. In a motor vehicle, a unitary main chassis frame formed from two separate front and rear sections attached together, each section comprising spaced longitudinal side frame members, a body mounted on said rear section and including spaced upright pillars secured at their lower ends to the corresponding side frame members and also including front and rear seat trays, the front seat tray extending between the outer side frame members of the rear section and having front and rear depending flanges, a cross frame member extending below said seat tray in supporting relation intermediate said flanges and connecting the outer side frame members, the lower edges of said flanges being substantially below the upper portions of the cross frame member therebetween and also substantially below the upper portions of the outer side frame members, a second cross frame member underlying the rear seat tray and connecting the outer side frame members, a depressed rear floor member secured to the lower edge of said rear depending flange and also secured to said second cross frame member and said outer side frame members at their lower portions, a depressed front floor member secured to the lower edge of said front depending flange and to the outer side frame members, and inner longitudinal side frame members extending below said floor members in supporting relation and secured to lower portions of said first named cross frame member.

3. A motor vehicle having a combined body and chassis frame comprising inner and outer longitudinal side frame members at each side of the frame, transversely spaced upright body pillars having the lower ends thereof attached to the outer side frame members, a forward cross frame member connecting said inner and outer longitudinal side frame members at the region underlying the vehicle front seat, a second cross frame member spaced rearward of the front seat and connecting said outer longitudinal side frame members, the inner longitudinal frame members being secured to the lower portions of the forward cross frame member, the upper edges of the inner longitudinal frame members in advance of the forward cross frame member being at the level of the lower portions of the outer longitudinal frame members, and a forward floor member overlying said inner longitudinal frame members in supported relation and secured to said outer side frame members a substantial distance below the upper edges thereof.

4. A motor vehicle having a combined body and chassis frame comprising inner and outer longitudinal side frame members at each side of the frame, transversely spaced upright body pillars having the lower ends thereof attached to the outer side frame members, a forward cross frame member connecting said inner and outer longitudinal side frame members at the region underlying the vehicle front seat, a second cross frame member spaced rearward of the front seat and connecting said outer longitudinal side frame members, the inner longitudinal frame members being secured to the lower portions of the forward cross frame member, the upper edges of the inner longitudinal frame members in advance of the forward cross frame member being at the level of the lower portions of the outer longitudinal frame members, a forward floor member overlying said inner longitudinal frame members in supported relation and secured to said outer side frame members a substantial distance below the upper edges thereof, and a second floor member extending between said cross frame members and secured to one thereof a substantial distance below the upper edges thereof.

5. A motor vehicle having a combined body and chassis frame comprising inner and outer longitudinal side frame members at each side of the frame, transversely spaced upright body pillars having the lower ends thereof attached to the outer side frame members, a forward cross frame member connecting said inner and outer longitudinal side frame members at the region underlying the vehicle front seat, a second cross frame member spaced rearward of the front seat and connecting said outer longitudinal side frame members, the inner longitudinal frame members being secured to the lower portions of the forward cross frame member, the upper edges of the inner longitudinal frame members in advance of the forward cross frame member being at the level of the lower portions of the outer longitudinal frame members, a forward floor member overlying said inner longitudinal frame members in supported relation and secured to said outer side frame members a substantial distance below the upper edges thereof, a second floor member extending between said cross frame members and secured to one thereof a substantial distance below the upper edges thereof, and longitudinal frame members supporting said second floor member and connecting the lower portions of said cross frame members together.

6. A motor vehicle having a combined body and chassis frame comprising inner and outer longitudinal side frame members at each side of the frame, transversely spaced upright body pillars having the lower ends thereof attached to the outer side frame members, a forward cross frame member connecting said inner and outer longitudinal side frame members at the region underlying the vehicle front seat, a second cross frame member spaced rearward of the front seat and connecting said outer longitudinal side frame members, the inner longitudinal frame members being secured to the lower portions of the forward cross frame member, the upper edges of the inner longitudinal frame members in advance of the forward cross frame member being at the level of the lower portions of the outer longitudinal frame members, a forward floor member overlying said inner longitudinal frame members in supported relation and secured to said outer side frame members a substantial distance below the upper edges thereof, a second floor member, and a second pair of inner longitudinal frame members joined to the lower portions of the cross frame members and supporting said second floor member at a level substantially below the upper edges of the outer side frame members.

7. In a motor vehicle, a unitary main chassis frame formed from two separate front and rear sections attached together, each section comprising spaced longitudinal side frame members, a body mounted on said rear section and including spaced upright pillars secured at the lower ends to the corresponding side frame members and also including front and rear seat trays, the front seat tray extending between the outer side frame members of the rear section and having front and rear depending flanges, a cross frame member extending below said seat tray in supporting relation intermediate said flanges and connecting the outer side frame members, the lower edges of said flanges being substantially below the upper portions of the cross frame member therebetween and also substantially below the upper portions of the outer side frame members, a second cross frame member underlying the rear seat tray and connecting the outer side frame members, a depressed rear floor member secured to the lower edge of said rear depending flange and also secured to said second cross frame member and said outer side frame members at their lower portions, a depressed front floor member secured to the lower edge of said front depending flange and to the outer side frame members, and inner longitudinal side frame members extending below said floor members in supporting relation and secured to lower portions of said first named cross frame member, certain of said inner longitudinal side frame members being also secured to lower portions of said second named cross frame member.

8. In a motor vehicle, a unitary main chassis frame formed from two separate front and rear sections attached together, each section comprising spaced longitudinal side frame members, a body mounted on said rear section and including spaced upright pillars secured at the lower ends to the corresponding side frame members and also including front and rear seat trays, the front seat tray extending between the outer side frame members of the rear section and having front and rear depending flanges, a cross frame member extending below said seat tray in supporting relation intermediate said flanges and connecting the outer side frame members, the lower edges of said flanges being substantially below the upper portions of the cross frame member therebetween and also substantially below the upper portions of the outer side frame members, a second cross frame member underlying the rear seat tray and connecting the outer side frame members, a depressed rear floor member secured to the lower edge of said rear depending flange and also secured to said second cross frame member and said outer side frame members at their lower portions, a depressed front floor member secured to the lower edge of said front depending flange and to the outer side frame members, and inner longitudinal side frame members extending below said floor members in supporting relation and secured to lower portions of said first named cross frame member, certain of said inner longitudinal side frame members extending forward from said first named cross frame member to comprise the outer longitudinal side frame members of the front section.

MILLARD H. TONCRAY.
FRANK S. SPRING.

REFERENCES CITED

The following references are of record in the file of this patent:

UNITED STATES PATENTS

| Number | Name | Date |
|---|---|---|
| 1,143,987 | Nelson | June 22, 1915 |
| 2,108,215 | Stief et al. | Feb. 15, 1938 |
| 2,216,120 | Ledwinka | Oct. 1, 1940 |
| 2,324,677 | Cadwallader | July 20, 1943 |
| 2,551,528 | Darrin | May 1, 1951 |

FOREIGN PATENTS

| Number | Country | Date |
|---|---|---|
| 533,702 | Great Britain | Feb. 18, 1941 |
| 601,189 | Germany | Aug. 10, 1934 |
| 769,380 | France | June 5, 1934 |
| 834,496 | France | Aug. 22, 1938 |
| 870,108 | France | Dec. 5, 1941 |
| 897,951 | France | June 19, 1944 |